No. 737,973. PATENTED SEPT. 1, 1903.
C. E. TAYLOR.
ICE CREAM FREEZER.
APPLICATION FILED MAY 27, 1903.
NO MODEL. 2 SHEETS—SHEET 2.
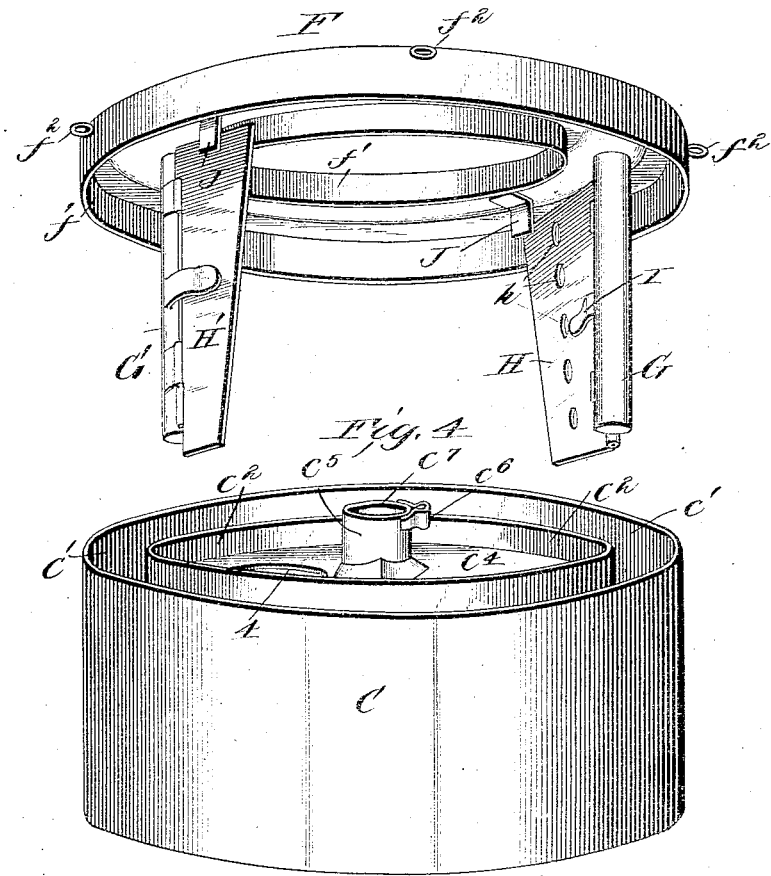
WITNESSES:
Fred P. Bradford
Jos. A. Ryan
INVENTOR
Charles E. Taylor
BY Munn & Co.
ATTORNEYS.

No. 737,973. Patented September 1, 1903.

UNITED STATES PATENT OFFICE.

CHARLES EDWIN TAYLOR, OF MAGNOLIA, ARKANSAS, ASSIGNOR OF ONE-HALF TO MOLLIE G. MAGALE, OF MAGNOLIA, ARKANSAS.

ICE-CREAM FREEZER.

SPECIFICATION forming part of Letters Patent No. 737,973, dated September 1, 1903.

Application filed May 27, 1903. Serial No. 158,947. (No model.)

*To all whom it may concern:*

Be it known that I, CHARLES EDWIN TAYLOR, residing at Magnolia, in the county of Columbia and State of Arkansas, have invented a new and Improved Ice-Cream Freezer, of which the following is a specification.

My invention seeks to provide a new and improved ice-cream freezer of that type in which is included a cream-holder detachably supported and rotatable within a refrigerant-holding vessel, and in its generic nature it comprehends a peculiar coöperative arrangement of an outer can or vessel having a centrally-disposed stationary agitating means, including a central standard, an annular cream-holding can having a hollow pendent member adapted to fit and rotate upon the central standard and around the stationary agitating or refrigerant-circulating means, a detachable cover for the annular cream-holder having pendent scraper and dasher members adapted to project into the cream-holder, means for holding the cover from turning, and a detachably-connected actuating-handle.

In its more complete nature my invention comprises a new combination of parts of a simple and economical construction capable of freezing the cream in a minimum amount of time and labor, which can be readily repaired by an ordinary tinner, and in which the parts have such correlation that the same can be conveniently used for either domestic or manufacturer's uses. In addition to its especial use as an ice-cream freezer it can be used for cooking the cream in the holder and as a milk-cooler, &c.

In its more subordinate features my invention also embodies certain details of construction and peculiar combination of parts, all of which will hereinafter be fully described, and specifically pointed out in the appended claims, reference being had to the accompanying drawings, in which—

Figure 1 is a vertical longitudinal section of my improved ice-cream freezer, taken substantially on the line 1 1 of Fig. 2. Fig. 2 is a horizontal section of the same on the line 2 2 of Fig. 1. Fig. 3 is a detail perspective view of the annular cover with the pendent combined scraper and dasher members. Fig. 4 is a detail view of the cream-holder, which is rotatably held in the main vessel or refrigerant-holder. Fig. 5 is a detail perspective view of the bottom of the main vessel, the stationary refrigerant-agitating means mounted thereon, and the central standard and ball-bearing.

In the practical construction of my improved ice-cream freezer the same comprises a tub-like vessel 1, having an outwardly-flaring rim $1^a$ at the upper end, and the said vessel, together with the cream-holder, the annular cover-plate, and the scraper or dasher members pendent therefrom and hereinafter referred to, are made of tin, galvanized iron, or other sheet metal.

Centrally mounted on the bottom $a$ of the vessel and fixedly connected thereto is a vertically-disposed refrigerant-ejecting means consisting of a conical-shape base $b$, from the apex of which extends upwardly a tubular standard $b'$, the upper end of which terminates in a cup $b^2$ for conveniently holding a bearing-ball $c$, and from the said base $b$ also projects upwardly a series of radially-disposed plates $b^3$, that extend to a point near the standard $b^2$ and terminate in right-angle flanges $b^4$, that form baffles or breaker members and also guides for a purpose presently explained, and the plates $b^3$ are braced at their upper ends by a ring $b^5$, as best shown in Fig. 5.

C designates the cream-holder, which consists of an outer cylinder $c'$ of sufficiently less diameter than the vessel 1 to provide for an annular space X between the holder and the vessel 1 to receive the refrigerant, an inner cylinder $c^2$, and a bottom $c^3$, that connects the lower ends of the cylinders $c'$ $c^2$, whereby to provide an annular chamber $y$ for receiving the cream or other substance to be frozen, and the inner cylinder $c^2$ is closed at the top by a head-plate $c^4$, which has an opening 4 for feeding the ice or other refrigerant into the hollow space within the cylinder $c^2$ and to contact with the stationary agitating means on the bottom of the vessel 1, which agitating means extends up into the hollow of the said inner cylinder $c^2$ when the parts are in their operative positive position.

$c^5$ designates a tubular stem fixedly secured to the head-plate $c^4$, a portion of which is pendent from the said head-plate and is adapted to fit over the tubular standard $b^2$ and be guided by the flanges $b^4$ of the plates $b^3$, and the upper end $c^7$ of the standard $c^5$ projects in a plane above the cream-holder and has a laterally-disposed vertical socket $c^6$, adapted to receive a locking-stud $d'$ on the handle D, which also has a pendent cuff $d$ to fit over the upper end $c^7$ of the member $c^5$, and the said member $c^5$ is also provided with a solid bearing $c^8$ to engage the bearing-balls $c$, as clearly shown in Fig. 1.

F designates an annular cover adapted to detachably fit over the cream-holders to close the annular cream-receiving chamber thereof, and the said cover has pendent $f'$ $f'$ to fit over the edges of the inner and outer cylinders $c'$ $c^2$, and the said cover is further provided with a series of eyes $f^2$ to receive hooks E, pivotally connected to the edge $1^c$ of the vessel 1, whereby to lock the cover F from rotation.

G G' denote arms pendently secured to the cover F, preferably at diametrically opposite points, and the said arms are of a length to extend near the bottom of the annular cream-chamber, as clearly shown in Fig. 1.

To the arm G is secured a combined dasher and scraper-blade H, hinged to the said arm for a limited swing in a horizontal plane, and it is held to automatically engage and scrape against the outer wall of the annular cream-holder to a suitable spring I, which may be arranged as shown in Fig. 2, and the said blade H has a series of apertures $h$, and it is made tapering in width from the top to the bottom to facilitate a proper flow or churning action of the cream.

H' indicates a blade hinged to the arm G'. This blade is not apertured and is of less width than the opposing blade H, and the spring connection therefor is such as to hold it in engagement with and to scrape over the inner wall of the cream-holding chamber, as clearly shown in Fig. 2.

J denotes stops on the under side of the cover for preventing back swing of the blades H and H', and K denotes the plug-outlet of the vessel 1.

From the foregoing description, taken in connection with the accompanying drawings, it is thought the complete construction and advantages of my invention will readily appear.

In using the invention for freezing the space internal of the removable holder C is filled with the refrigerant, which is entered through the opening in the top plate of the said holder, and the refrigerant within the said space is held in a proper contact with the inner wall of the annular cream-holder by the agitating devices mounted on the bottom of the vessel 1. The cream or other material to be frozen is then poured into the annular chamber of the holder C, and the cover F is then fitted in place and held from rotation by hooking it to the vessel, as shown. The space X is then filled with the ice and salt or other refrigerant and the handle attached. By reason of the entire weight of the holder C being upon the bearing-balls mounted in the upper end of the standard projected up from the base of the vessel 1, and as the said holder C is guided by the rotary blade $b^2$, the said holder can be readily rotated with but a minimum exertion, it being understood the freezing is much facilitated by reason of the stirring, the dasher and scraping action produced within the cream-chamber by the stationarily-held blades H and H'.

Having thus described my invention, what I claim, and desire to secure by Letters Patent, is—

1. In an ice-cream freezer as described; a cylindrical tub or vessel for holding the refrigerant, having a central standard projected vertically from the bottom thereof, a series of blades radially disposed with respect to the standard and secured to the bottom of the said vessel, a cream-holder detachably supported on the upper end of the said standard, said holder having an inner chamber open at the bottom and adapted to fit over the aforesaid rotary blades, and an annular cream-receiving chamber open at the top, a cover detachably mounted over the said annular chamber, means for connecting the cover to the refrigerant-holding vessel, and a means for turning the inner or cream-holding vessel on its central support, as described, 2. An ice-cream freezer of the character described, comprising in combination with the outer cylindrical vessel having a central vertically-disposed standard, and a bearing-ball in the upper end of the said standard; of an inner or cream-holding cylindrical vessel, said vessel having an inner chamber open at the bottom, a central pendent socket adapted to fit loosely over the central standard on the outer vessel and to rest upon the bearing-ball, said inner vessel also including an annular cream-holding chamber open at the top, a cover detachably supportable over said annular chamber, means for fixedly connecting said cover with the vessel 1, and a handle detachably joined with the inner vessel for turning the said vessel within the refrigerant-holding tub or outer vessel, as set forth.

3. In an ice-cream freezer as described; the combination of an outer or refrigerant-holding vessel, said vessel having a centrally-disposed vertical standard, a conical base surrounding the lower end thereof, vertical blades projected from the said base and disposed radially of the standard and having their inner ends bent at right angles to form guide-flanges $b^4$, of an inner vessel detachably supportable and rotatable upon the central standard, said inner vessel including an inner and an outer cylinder joined by a bottom plate, the inner cylinder being of a diameter to fit over the radial blades projected up from the bottom of the outer vessel, a top plate $c^4$ for the inner vessel, a socket joined therewith for engaging the vertical bearing-standard, an actuating-handle detachably connected with said socket, an annular cover for the space between the inner and outer cylinders of the rotatable inner vessel, means for connecting said cover to the outer vessel, a dasher and scrapers pendent from the said cover projected into the annular chamber of the inner vessel, said dasher and scrapers, including spring-held yielding plates for engaging the walls of the said annular chambers, as set forth.

CHARLES EDWIN TAYLOR.

Witnesses:
J. F. RUMYAN,
J. H. JONES.